W. P. SMITH.
SAFETY ATTACHMENT FOR BOILERS.
APPLICATION FILED JULY 15, 1911.
1,040,800.
Patented Oct. 8, 1912.
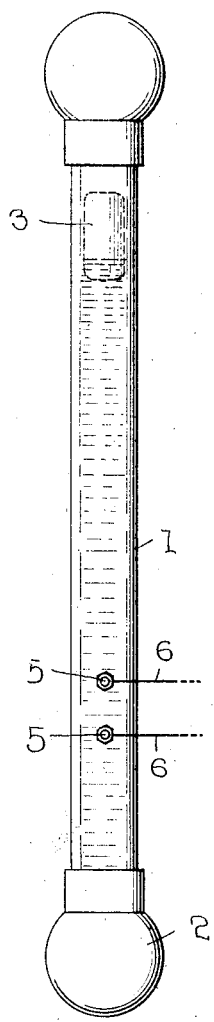
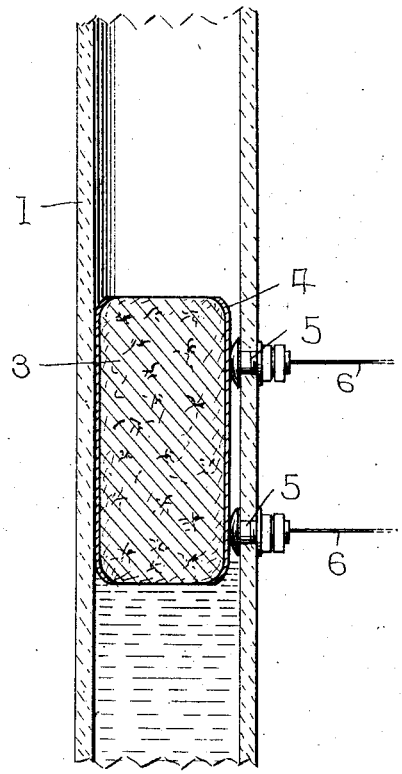
WITNESSES:
INVENTOR
W. P. Smith
BY
W. J. Fitzgerald & Co.
Attorneys

UNITED STATES PATENT OFFICE.

WILLIAM P. SMITH, OF LOCUST GROVE, VIRGINIA.

SAFETY ATTACHMENT FOR BOILERS.

1,040,800.     Specification of Letters Patent.     Patented Oct. 8, 1912.

Application filed July 15, 1911. Serial No. 638,711.

*To all whom it may concern:*

Be it known that I, WILLIAM P. SMITH, a citizen of the United States, residing at Locust Grove, in the county of Orange and State of Virginia, have invented certain new and useful Improvements in Safety Attachments for Boilers; and I do hereby declare the following to be a full, clear, and exact description of the invention, such as will enable others skilled in the art to which it appertains to make and use the same.

My invention relates to new and useful improvements in safety attachments for boilers and my object is to place in the usual or in any preferred form of glass gage a float which is adapted to rise and fall with the action of the water in the gage.

A further object is to provide a pair of contact points and extend the same through the wall of the gage, said contact points being connected with a battery and signaling mechanism, and, a further object is to provide metallic parts for the float whereby when both of the contact points are in engagement therewith the circuit will be closed and the signal operated.

Other objects and advantages will be hereinafter set forth and pointed out in the specification.

In the accompanying drawings, which are made a part of this application, Figure 1 is an elevation of the gage showing my improved contact mechanism applied thereto. Fig. 2 is an enlarged detail sectional view of the gage and float.

Referring to the drawings in which similar reference numerals designate corresponding parts throughout the several views, 1 indicates the gage, which preferably consists of an elongated glass tube, having an anchoring means 2 at each end thereof, which anchoring means is hollow and connects with the interior of a boiler (not shown) so that the amount of water contained in the boiler will be indicated in the gage.

The height of the water in the gage is regulated by the amount of water in the boiler, the greater amount of water in the boiler the higher the water extends in the gage and in order to guard against the possibility of the water becoming so low in the boiler as to reach the danger point I have provided my improved signaling mechanism so that although the engineer may be a distance from the boiler he will be notified when the water has reached the danger point.

The signaling mechanism comprises a cylindrical float 3, which is preferably constructed of cork or similar substance, which is introduced into the gage and moves upwardly and downwardly therein with the movement of the water. The float is provided with a jacket or covering 4, preferably of copper or similar non-corroding substance, the ends of the jacket being swaged or bent inwardly over the ends of the float. Extending through the wall of the gage is a pair of contact points, or bolts 5, the inner ends thereof being rounded so that when the rounded ends of the float come in contact therewith a perfect contact is made owing to the binding action between the two rounded surfaces. Attached to the contact points 5 are wires 6 which are in turn attached to a suitable battery and signaling mechanism, (not shown).

In practice the water in the boiler is normally kept at such a stage as to cause the water in the gage to extend to a point adjacent the upper end thereof, thus normally supporting the float at the upper end of the gage, the float being of slightly less diameter than the interior of the gage so as not to close communication through the gage. If for any reason a new supply of water is not placed in the boiler the water in the gage will descend as the volume of water in the boiler is converted into steam, thereby lowering the float and by placing the contact points adjacent the lower end of the gage the signal will not be operated until nearly all of the water is consumed in the boiler. As soon as the float has descended until both of the contact points are in engagement with the float, the electric circuit will be closed and the signal operated, and the signal will continue in operation until a new supply of water is added to the boiler and the float elevated out of engagement with the contact points.

What I claim is:

1. A float attachment for boilers comprising the combination with a gage of a pair of contact points extending through the wall of the gage and spaced longitudinally thereof, and a cylindrical metallic float adapted to contact with the points and complete the circuit between the contact points.

2. A float attachment for boilers comprising the combination with a gage of a pair of contact points extending through the wall of the gage and spaced longitudinally thereof, the inner ends of said contact points being rounded and a cylindrical metallic float having rounded edges adapted to contact with the rounded ends of the points and complete the circuit between the contact points.

In testimony whereof I have signed my name to this specification in the presence of two subscribing witnesses.

WILLIAM P. SMITH.

Witnesses:
T. A. ALMOND,
J. W. KUBE.

---

Copies of this patent may be obtained for five cents each, by addressing the "Commissioner of Patents, Washington, D. C."